US005316364A

United States Patent [19]

Ohya

[11] Patent Number: 5,316,364

[45] Date of Patent: May 31, 1994

[54] STRUCTURE OF A DOOR FOR AN AUTOMOTIVE VEHICLE

[75] Inventor: Takeji Ohya, Hiroshima, Japan

[73] Assignee: Mazda Motor Corporation, Hiroshima, Japan

[21] Appl. No.: 989,683

[22] Filed: Dec. 14, 1992

[30] Foreign Application Priority Data

Dec. 12, 1991 [JP] Japan .............................. 3-109841[U]
Dec. 12, 1991 [JP] Japan .............................. 3-351561

[51] Int. Cl.[5] .............................. B60J 5/04
[52] U.S. Cl. .............................. 296/146.5; 49/503
[58] Field of Search .............................. 96/146 B, 146 R; 49/502, 503; 16/110 R

[56] References Cited

U.S. PATENT DOCUMENTS 4,827,671 5/1989 Herringshaw .............................. 49/503
4,831,710 5/1989 Katoh et al. .............................. 296/146 B X
4,956,943 9/1990 Yamada et al. .............................. 49/503

FOREIGN PATENT DOCUMENTS 63-66318 5/1988 Japan .

*Primary Examiner*—Robert R. Song
*Attorney, Agent, or Firm*—Fish & Richardson

[57] ABSTRACT

A door for an automotive vehicle includes a bracket that is mounted to an upper portion of a door panel and projects upwards from the door panel, a key cylinder for locking or unlocking the door where a key insert hole of the key cylinder is mounted to the bracket and is directed towards the outside of the automotive vehicle body, a door handle base that is mounted to the bracket so that it covers the key cylinder from the outside of the automotive vehicle body such that the door handle base has an aperture positioned opposite from the key insert hole of the key cylinder, and a door handle for opening or closing the door that is mounted to the door handle base.

30 Claims, 6 Drawing Sheets

STRUCTURE OF A DOOR FOR AN AUTOMOTIVE VEHICLE

BACKGROUND OF THE INVENTION

1. Field of the Invention

The present invention relates to the structure of a door for an automotive vehicle.

2. Description of the Related Art

The conventional structure of a door for an automotive vehicle, as disclosed in Japanese Patent Laid-open Publication (kokai) No. 63-66,318, is arranged so that a door handle base is disposed at the upper portion of a door handle base of the door projecting upwards therefrom and a key cylinder is mounted to the door handle base in addition to an outer door handle.

This structure requires an operator to bend its body forward for inserting the key into the key cylinder and opening or closing the door if the height of the vehicle were to be lowered. Further, this conventional structure of the door has the disadvantage that the material used for the door handle base is restricted to one a having ridigity higher than the rigidity of, for example, aluminum die cast because the key cylinder is mounted directly to the door handle base.

SUMMARY OF THE INVENTION

Therefore, the present invention has been accomplished to solve the disadvantage inherent in the conventional structure of the door as described hereinabove. An object of the invention is to provide an improvement in the structure of a door for an automotive vehicle adapted to allow freedom of selection of material for the door handle base.

The present invention has as another object to provide the structure of a door adapted as to prevent a third party from opening the door, for example, for theft or mischievous purposes.

In order to achieve the aforesaid object, the present invention has a door structure for an automotive vehicle, comprising:

- a bracket mounted to an upper portion of a door panel, projecting upwards from the door panel;
- a key cylinder for locking or unlocking the door, a key insert hole of the key cylinder mounted to the bracket towards the outside of the automotive vehicle body,
- a door handle base mounted to the bracket to cover the key cylinder from the outside of the body, the door handle base having an aperture disposed in a position corresponding to the key insert hole of the key cylinder; and
- a door handle for opening or closing the door, the door handle mounted to the door handle base.

The arrangement for the structure of the door for the automotive vehicle does not require a high degree of rigidity for supporting the key cylinder because the key cylinder is supported with the bracket. Hence, this arrangement expands the selection of materials that can be used for the door handle base.

Further, as the key cylinder with a key insert hole formed therein is substantially covered over its entire top surface area with the door handle base and the door handle base is provided with an aperture through which the key is inserted to reach the key insert hole of the key cylinder, the area of the top end portion of the key cylinder, which is encountered with the outside of the body, can be minimized as necessary as possible, thereby preventing the key cylinder from illegally being opened by a third party, for example, for thief purposes or due to mischief.

Other objects, features and advantages of the present invention will become apparent during the course of the description of the preferred embodiments, which follows, with reference to the accompanying drawings.

DESCRIPTION OF THE PREFERRED EMBODIMENTS

The present invention will be described in more detail with reference to the accompanying drawings.

Figure 1:
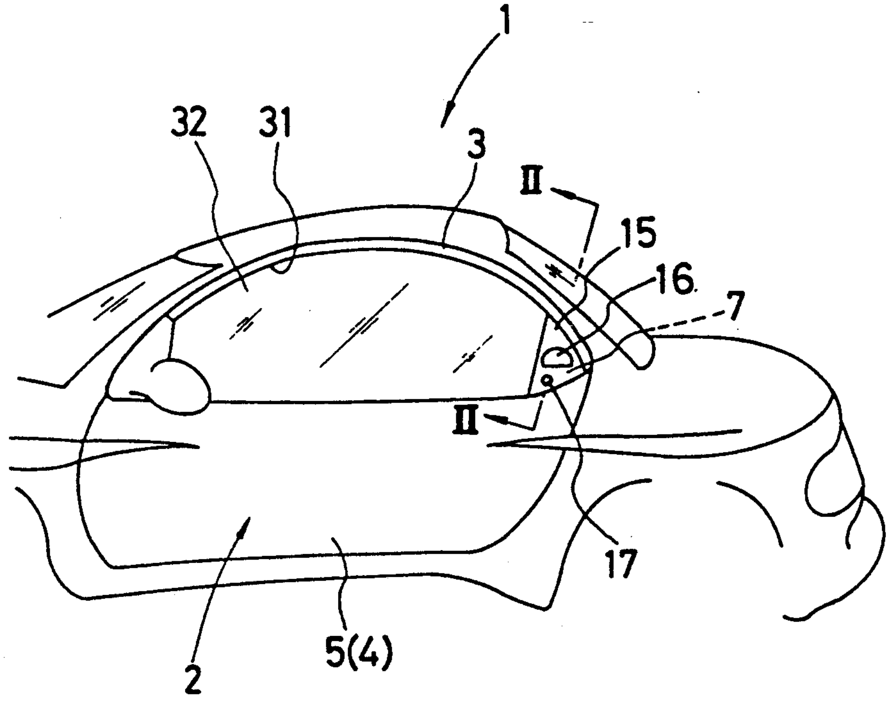
FIG. 1 is a side view showing the body of an automotive vehicle to which the structure of the door according to an embodiment of the present invention is applied.
Figure 2:
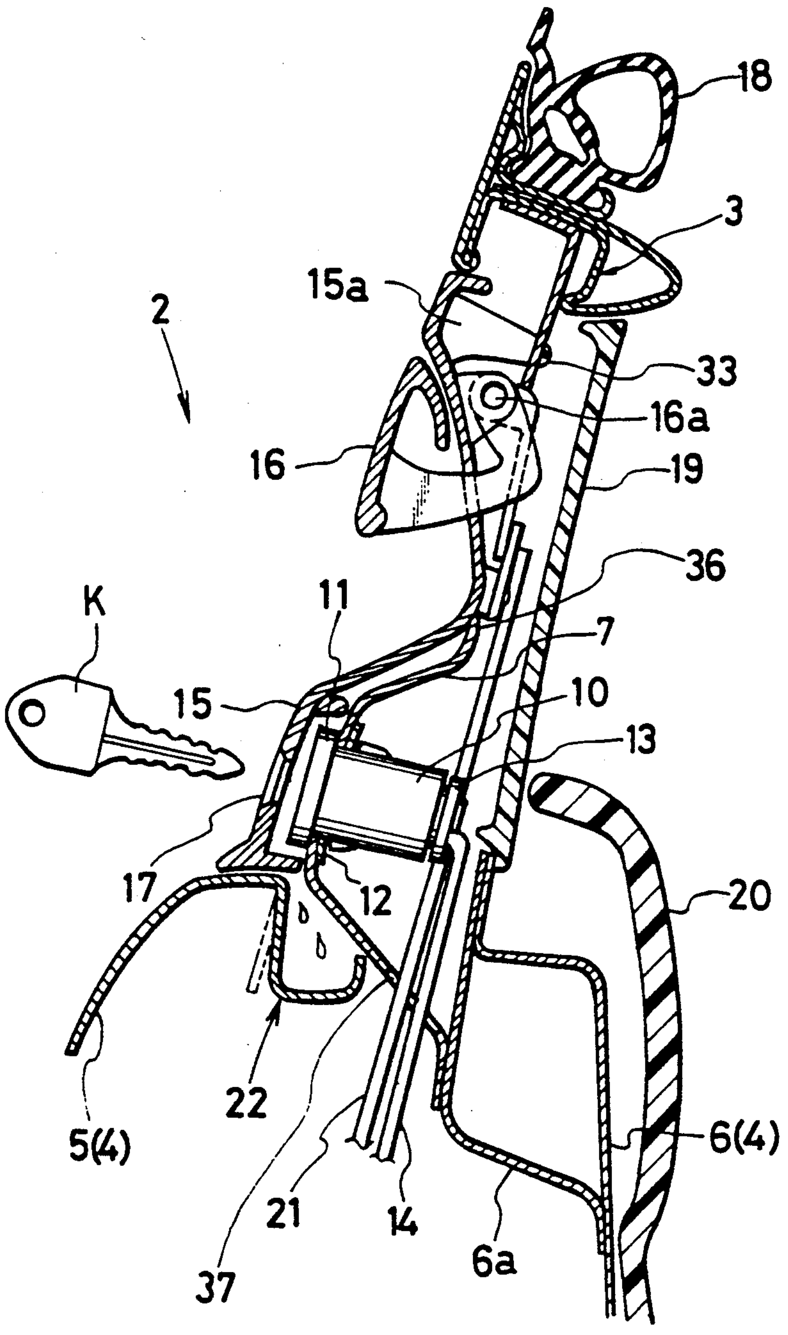
FIG. 2 is an enlarged sectional view as taken along line II—II of FIG. 1.

As shown in FIGS. 1 and 2, the body 1 of a vehicle is provided with a side door 2 which constitutes part of a side of the body 1 of the vehicle and which is shown in this embodiment as located next to the driver. The side door 2 of this embodiment is a sash door which is provided with a sash 3 at its top end portion. The lower half portion of the side door 2 is a door panel 4. The door panel 4 is comprised of an outer panel 5 and an inner panel 6. The outer panel 5 is located at the outer side of the body and the inner panel 6 is located at the inner side. Thus, the door panel 4 has a double structure, i.e. a hollow structure, as known to the art.

Further, a side window opening 31 interposed between the sash 3 of the side door 2 and the door panel 4 is closed or opened with a side door window glass panel 32 which is arranged so that it moves up and down. Hence, the side door 2 in this embodiment pivots on its front end and opens from its rear end. The rear end of the side door 2 is an open end.

As shown generally in FIG. 1, the door panel 4 has a corner bracket 7 at its upper rear corner section which projects upward. In other words, the corner bracket 7 is located at the corner section interposed between the sash 3 and the door panel 4 in the rear end of the side door 2. More specifically, as shown in FIG. 2, the corner bracket 7 is made of one sheet of a structuring material having a high physical strength, such as an iron plate. An upper portion of the corner bracket 7 extends along sash 3 and is connected to the inner side of the sash 3. A lower portion of the corner bracket 7 is connected to an inner panel reinforcement 6*a* which is a structuring section of the inner panel 6. An upper portion of the inner panel with the inner panel reinforcement 6*a* 6 provides a closed section. The connection may be implemented in any conventional manner such as welding, particularly spot welding, fastening with screws or bolts and nuts or adhesive, and so on.

As shown further in FIG. 2, the corner bracket 7 is provided with a door handle base 15 and a key cylinder 10. The door handle base 15 may be made of synthetic plastics and mounted to the corner bracket 7 at a number of fixed points to substantially cover the entire outer area of the corner bracket 7 from the outer side of the body. An outer door handle 16 is supported with an upper portion of the door handle base 15 to pivot outwards about a point 16*a*. The outer door handle 16 is associated through a push rod 21 with a mechanism for opening or closing the door, although not shown in the drawings. The door handle base 15 may be attached to the corner bracket 7 by projecting a mounting stay section 15*a* toward the inside of the body from the door handle base 15 and fastening the corner bracket 7 to the mounting stay section 15*a* with a screw 33.

Figure 3:
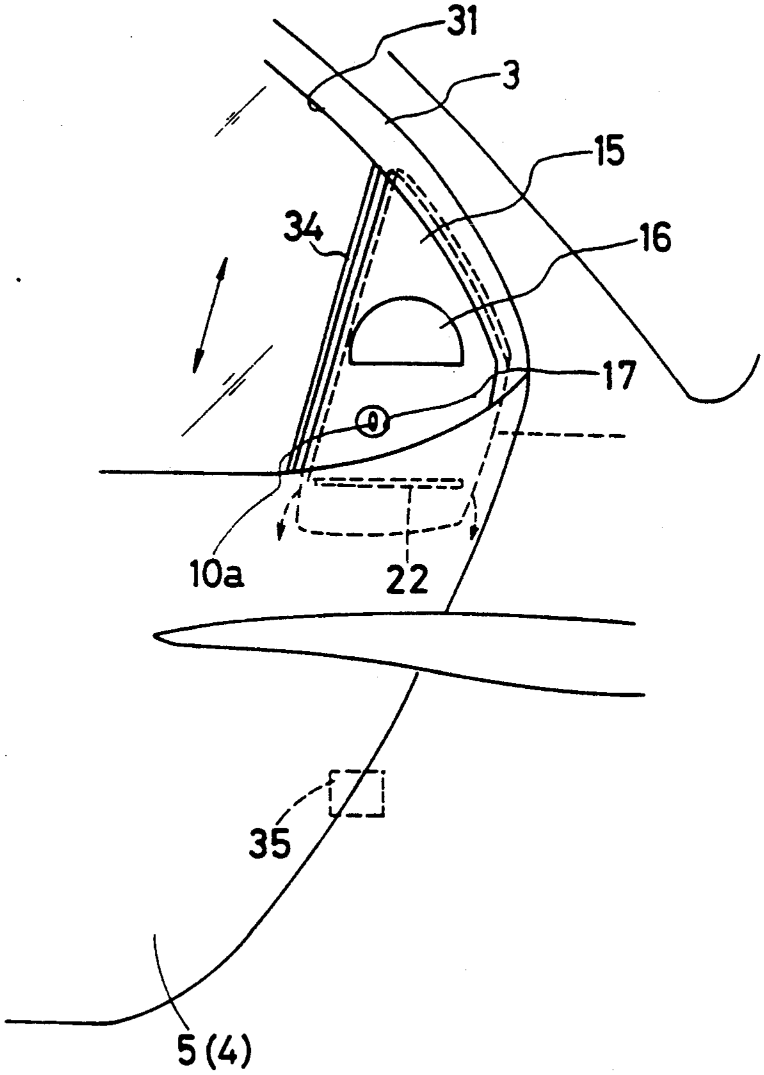
FIG. 3 is an enlarged view showing an essential portion of the structure of the door according to the embodiment of the present invention.
Figure 4:
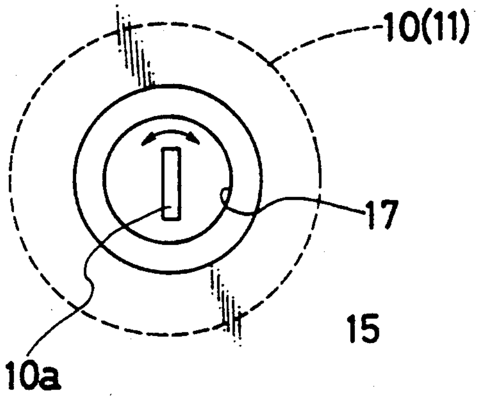
FIG. 4 is an enlarged view showing an aperture through which the key is inserted.

Further, as shown in FIG. 2, the key cylinder 10 is fixed to the corner bracket 7 on the lower side of the outer door handle 16 so that the entire top face area is substantially covered with the outer door handle base 15. More specifically, in this embodiment, a front portion of the key cylinder 10, i.e. an outer end portion thereof, is supported with a head 11 having an enlarged head diameter and a retainer 12, and is attached to the corner bracket 7. On the other hand, a rear portion of the key cylinder 10, i.e. an inner portion thereof, is connected to a key rod 14 through a link 13. The key rod 14 is in turn connected to a door lock mechanism, although not shown. A key insert hole 10*a* is disposed in the key cylinder 10 so as to be directed toward the outside of the body, as shown in FIGS. 3 and 4. The key K is inserted into the key insert hole 10*a* and allowed to pivot in a clockwise or counterclockwise direction to move the key rod up or down to lock or unlock the door lock mechanism, thus, closing or opening the side door 2.

As shown in FIGS. 1 to 4, the door handle base 15 is provided with an aperture 17 that faces the upper front end of the key cylinder 10 to allow the key K to be inserted through the aperture 17 and then into the key insert hole 10*a* of the key cylinder 10. The aperture 17 is small enough to allow only a front end section of the key K to be inserted through the aperture 17.

As will be apparent from the above description, the door handle base 15 is exposed directly to the outside of the body and comprises a portion of outer side of the side door 2. As shown in FIG. 3, a sealing member 34 is mounted as a weather strip member to a front side edge of the corner bracket 7 and the front side edge thereof abuts with a rear side end of the side door window glass panel 32 when the window is closed. Thus; it prevents preventing rain water or water drops from entering or leaking from a gap between the front side end of the corner bracket 7 and the rear side end of the side door window glass panel 32 when it is closed.

As shown in FIG. 2, the corner bracket 7 has an opening 36 to prevent interference with the outer door handle 16 and to communicate with the outer door handle 16 by the push rod 21 as well as with an opening 37 through which the key rod 14 and the push rod 21 pass.

Figure 5:
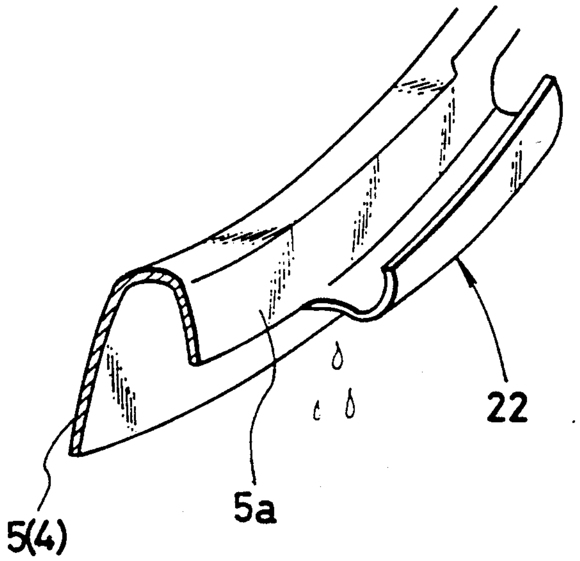
FIG. 5 is a perspective view showing a rain rail portion.

Further, as shown in FIGS. 2, 3, and 5, a rain rail portion 22 extends in the longitudinal direction of the body. It is formed by bending a flange portion of the outer panel 5 upwards to receive rain drops and is disposed below the key cylinder 10, but above a door latch 35. Further, the rain rail portion 22 extends so that both ends deviate from the position of the door latch 35 to prevent rain water and water drops from falling directly onto the door latch 35.

As shown in FIG. 2, reference numeral 18 stands for a weather strip member, reference numeral 19 for an inner garnish member, and reference numeral 20 for a door trim member.

As the key cylinder 10 is mounted to the corner bracket 7 in accordance with the embodiment of the present invention the key cylinder 10 is not required to be mounted directly on the door handle base 15. Thus no particular rigidity is required for the door handle base 15 to support the key cylinder 10. Hence, it is possible to use material having a low rigidity, such as a plastic material, for the door handle base 15.

It can further be noted that the key cylinder 10 is disposed so that it is covered with the door handle base 15. The aperture 17 is provided in the smallest possible size to allow key K to be inserted therethrough, reach the front end of the key cylinder 10, and then pivot to open and close the side door 2. Thus, this structure can prevent the side door 2 from being unlocked in a wrong or illegal way, by a example, for thief.

Furthermore, even if rain water or the like leak from the aperture 17 into the inside of the door panel 4, the rain rail portion 22 is arranged to receive and guide the rain water or drops so that the rain water or drops do not fall on the door latch 35. It can be noted, however, that the position of the rain rail portion 22 is optional in the embodiment of the present invention because no rain water or drops would fall directly upon the door latch 35 if the aperture 17 is located in a remote position so that rain water or drops do not to fall directly upon the door latch 35, as indicated by the phantom lines in FIG. 2.

Figure 6:
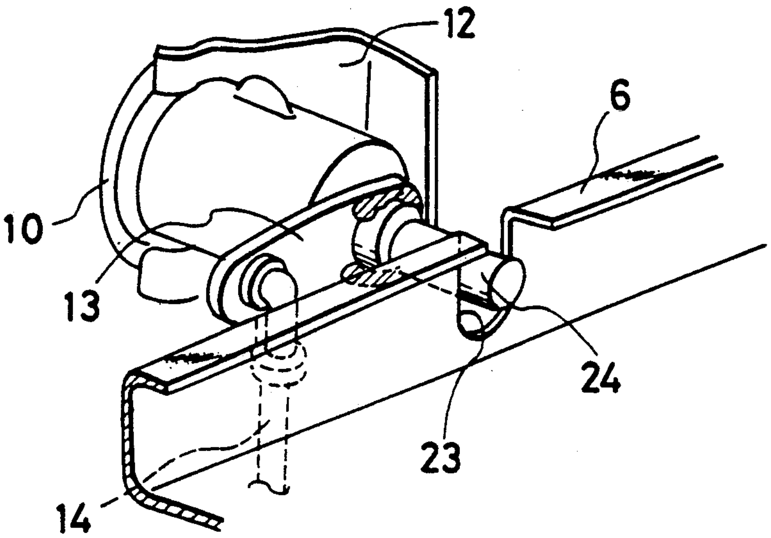
FIG. 6 is a perspective view showing a key cylinder portion according to a second embodiment of the present invention, as viewed from the inside of the body.

FIG. 6 shows the second embodiment of the present invention, in which the same or like elements are provided with the same reference numerals as in the first embodiment as described hereinabove and a description of those elements is omitted from the description which follows for brevity of explanation.

In the second embodiment of the present invention, as shown in FIG. 6, the inner panel 6 has a U-shaped engaging groove 23 as an engaging section, which is located behind the rear portion of the key cylinder 10, i.e. at the inner side of the body.

On the other hand, the key cylinder 10 is provided at its rear portion with an extension section 24 which extends behind the rear portion of the key cylinder 10 to engage with and to be inserted into the engaging groove 23 formed in the inner panel 6.

Further, in the second embodiment of the present invention, the key cylinder 10 is supported at its front portion with the corner bracket 7, and at its rear portion with the inner panel 6 with the aid of the engaging groove 23 and the extension section 24, on the other hand. This arrangement supports the key cylinder 10 from both, its front and rear end portions, key cylinder 10 is prevented from being opened, by a example, for thief, even if a screw driver or any other similar means were to be inserted through the aperture 7 into the key insert hole 10*a* and moved in up and down because the aforesaid arrangement inhibits the rear portion of the key cylinder 10 from upward and downward pivotal movement with the front portion thereof functioning as a fulcrum and likewise from a pivotal movement in the longitudinal direction.

In addition, the position of the extension section 24 on the key cylinder 10 assists in substantially increasing the length of the key cylinder 10 in the axial direction which increase the moment arm to a length longer than the key cylinder 10 without an extension section, when the pivotal movement of the rear portion of the key cylinder 10 with its front portion serving as the fulcrum is taken into account. This arrangement can counteract an improper opening of the key cylinder 10 with more strength force. It can be noted herein that this mode according to the second embodiment of the present invention is particularly effective when the key cylinder 10 is arranged so that it unlocks when the key rod 14 is displaced downwards.

It is further to be noted that the engaging groove 23 may be provided in the inner panel reinforcement 6a serving as a portion of the inner panel 6.

Figure 7:
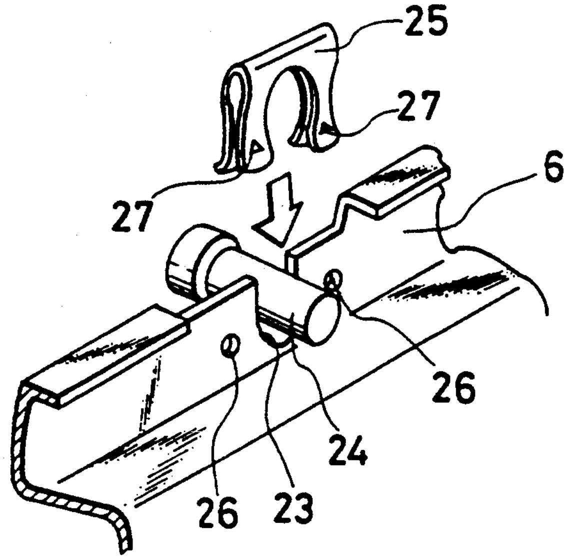
FIG. 7 is a perspective view showing a key cylinder portion according to a third embodiment of the present invention, as viewed from the inside of the body.

FIG. 7 shows the third embodiment of the present invention, in which the same or like elements are provided with the same reference numerals as in the first embodiment as described hereinabove and a description of those elements is omitted from the description which follows for brevity of explanation.

As shown in FIG. 7, the third embodiment of the present invention is structured so that the end retainer 25 is attached to the inner panel 6 in order to cover the extension section 24 from its upper side. The inner panel 6 is provided with an engaging hole 26, and the end retainer 25 is provided with an engaging paw 27 in order to be engaged with the engaging hole 26 formed in the inner panel 6. It is noted herein that a hole formed by folding the engaging paw is provided with reference numeral for brevity of explanation.

In the third embodiment of the present invention, the upward and downward pivotal movement at the rear portion (the extension section 24) of the key cylinder 10 is regulated by association of the paw 27 of the end retainer 25 with the engaging groove 23 of the inner panel 6. Hence, it can be noted that the third embodiment of the present invention can offer the effect more effective than the second embodiment of the present invention. Further, it can be noted that this system is effective, too, when the key cylinder 10 is arranged to be unlocked when the key rod 14 is displaced upwards.

Figure 8:
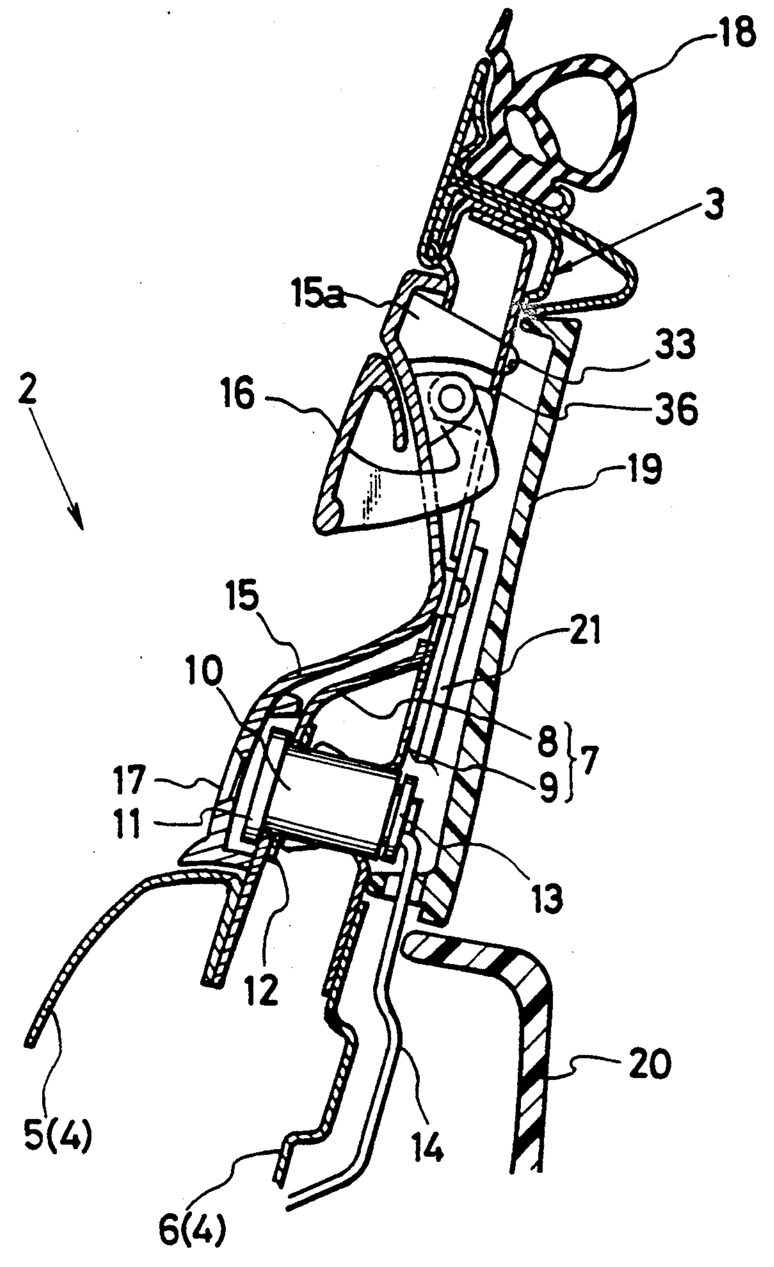
FIG. 8 is a sectional view showing the body of an automotive vehicle to which the structure of a door according to a fourth embodiment of the present invention is applied.

FIG. 8 shows the fourth embodiment of the present invention, in which the same or like elements are provided with the same reference numerals as in the first embodiment as described hereinabove and a description of those elements is omitted from the description which follows for brevity of explanation.

As shown in FIG. 8, the fourth embodiment of the present invention is structured so that the corner bracket 7 has a double structure formed by an outer bracket 8, located on the outer side of the body, and an inner bracket 9, located on the inner side thereof. The inner bracket 9 is arranged to be longer than the outer bracket 8 and to extend upwards to connect to the sash 3. On the other hand, an upper portion of the outer bracket 8 is connected to a nearly vertically middle portion of the inner bracket 9. Further, the lower portion of the outer bracket 8 is attached to the outer panel 5, and the lower portion of the inner bracket 9 is fixed to the inner panel 6.

In the fourth embodiment of the present invention, the key cylinder 10 is arranged to extend over the entire length through the outer bracket 8 and the inner bracket 9. Further, the front portion of the key cylinder 10 is supported by the outer bracket 8 and the rear portion is supported by the inner bracket 9. In addition, the front portion of the key cylinder 10 is attached to the head section 11 having an elongated head diameter and the retainer 12. The key rod 14 is connected to the rear portion of the key cylinder 10 through the link 13. It is to be noted that key rod 14 is disposed on the inner side of the inner bracket 9 and that key rod 14 is associated with a lock mechanism, although not shown, in the state as described hereinabove.

Further, in the fourth embodiment of the present invention, the displacement of the key cylinder 10 in an outwardly radial direction is regulated by the outer bracket 8 and the inner bracket 9 because the key cylinder 10 is supported at its front portion with the outer bracket 8 and at its rear portion with the inner bracket 9. Thus, this arrangement can prevent the rear portion of the key cylinder 10 from pivoting on the front portion of the key cylinder 10 which serves as the fulcrum even if a screwdriver or any other similar means is inserted through the key insert hole 10a of the key cylinder 10 and moved in upward and downward directions.

In addition, as the key rod 14 is disposed on the inner side of the inner bracket 9, it is extremely difficult to open the key cylinder 10 with a tool such as a screwdriver or the like from the outside. In order to allow the tool to be inserted into the key cylinder 10, the tool should be inserted inside the inner bracket 9. However, it is not easy for the tool to reach the inside of the inner bracket 9 because the tool must pass through the door handle base 15, the outer bracket 8, and the inner bracket 9.

Hence, the simple arrangement for the key cylinder 10 as described hereinabove can effectively prevent a third party from opening the key cylinder 10, by a example, for thief.

Further, since the outer bracket 8 is connected to the inner bracket 9, the rigidity of the corner bracket 7 itself is increased, thereby supporting the key cylinder 10 in a rigid way.

In addition, since the outer bracket 8 is connected to the inner bracket 9 above the key cylinder 10, rain water or water drops prevented from leaking into the key cylinder 10.

Furthermore, since the door handle base 15 is mounted to increased corner bracket 7 with the rigidity from its double structure, the supporting rigidity of the door handle base 15 is also increased.

In this case, since the highly rigid key cylinder 10 is attached to the outer bracket 8, the rigidity of the corner bracket 7 is further increased, thereby increasing the supporting rigidity of the door handle base 15.

As a matter of course, the structure of the door according to the embodiment of the present invention, as described hereinabove, can be applied to a back door and to the side doors as well. Further, as a matter of course, the embodiments of the present invention as described hereinabove can be applied to a so-called "sashless" door.

It should be understood herein that the foregoing text and description be interpreted to be not limitative in any respect, but to be illustrative, and any modifications, variants and changes which do not depart from the scope of the invention should be interpreted to be encompassed within the spirit and scope of the present invention.

What is claimed is:

1. A structure of a door for an automotive vehicle, comprising:

a bracket mounted to an upper portion of a door panel projecting upwards from said door panel;

a key cylinder for locking or unlocking said door mounted to said bracket and having a key insert hole disposed toward the outside of an automotive vehicle body;

a door handle base mounted to said bracket covering said key cylinder from the outside of said automotive vehicle body, said door handle base having an aperture disposed in a position corresponding to said key insert hole of said key cylinder; and a door handle for opening or closing said door, said door handle mounted to said door handle base.

2. A structure of a door for an automotive vehicle as claimed in claim 1, wherein said door handle base substantially covering said bracket so that said bracket is not visible from the outside of said automotive vehicle body; and said door handle base is comprised substantially of a portion of an external surface of said door.

3. A structure of a door for an automotive vehicle as claimed in claim 1, wherein said bracket is comprised of a material having greater strength than said door handle base.

4. A structure of a door for an automotive vehicle as claimed in claim 3, wherein said bracket is comprised of a metal, such as an iron plate; and said door handle is comprised of a plastic material.

5. A structure of a door for an automotive vehicle as claimed in claim 1, wherein said bracket is mounted on a transverse side end portion of said door.

6. A structure of a door for an automotive vehicle as claimed in claim 5, wherein said bracket is mounted on said transverse side end portion at an open side of said door.

7. A structure of a door for an automotive vehicle as claimed in claim 1, wherein said door has a sash; and said bracket is attached to said sash.

8. A structure of a door for an automotive vehicle as claimed in claim 1, wherein said door panel comprises an inner panel and an outer panel; and said bracket is attached to at least one of said inner panel and said outer panel.

9. A structure of a door for an automotive vehicle as claimed in claim 8, wherein said bracket is comprised of a sheet of a plate member and mounted to said inner panel.

10. A structure of a door for an automotive vehicle as claimed in claim 8, wherein said bracket is mounted to said outer panel.

11. A structure of a door for an an automotive vehicle as claimed in claim 8, wherein said bracket is comprised of a plurality of sheets of a plate member, said plurality of sheets being disposed in a direction of thickness of said door panel.

12. A structure of a door for an automotive vehicle as claimed in claim 11, wherein said plurality of sheets are connected at least partially with each other.

13. A structure of a door for an automotive vehicle as claimed in claim 8, wherein said bracket is comprised of first and second sheets of a plate member, said first sheet of said plate member being disposed on an inner side of said automotive vehicle body and said second sheet of said plate member being disposed on an outer side of said automotive vehicle body; and a lower end portion of said first sheet is attached to an upper portion of said inner panel, and a lower end portion of said second sheet is attached to an upper portion of said outer panel.

14. A structure of a door for an automotive vehicle as claimed in claim 13, wherein said key cylinder is fixed to said first sheet so that said key cylinder extends and passes through an entire thickness of said first sheet and said second sheet.

15. A structure of a door of an automotive vehicle as claimed in claim 8, wherein said door has a sash;

said bracket is disposed at a corner section, interposed between said sash and said door panel, such that an outer side end of said bracket extends along a shape of said sash;

a lower end portion of said bracket is attached to at least to an upper portion of said inner panel; and a portion of said bracket that extends along said shape of said sash is attached to an inner side end of said sash.

16. A structure of a door for an automotive vehicle as claimed in claim 1, wherein a rain rail portion is disposed below said key insert hole of said key cylinder.

17. A structure of a door for an automotive vehicle as claimed in claim 16, wherein said rain rail portion is comprised of a portion of an outer panel.

18. A structure of a door for an automotive vehicle as claimed in claim 16, wherein:

said rain rail portion is located above a door latch; and water leaked and guided by said rain rail portion does not drop directly onto said door latch from said rain rail portion.

19. A structure of a door for an automotive vehicle as claimed in claim 16, wherein said rain rail portion extends transverse of said door panel.

20. A structure of a door for an automotive vehicle as claimed in claim 8, wherein said door panel has an engaging portion;

said key cylinder has an extension portion extending toward an inner side of said automotive vehicle body; and said extension portion is engaged with said engaging portion of said door panel so that said key cylinder is controlled from moving in transverse and downward directions of said door panel.

21. A structure of a door for an automotive vehicle as claimed in claim 20, wherein said engaging portion of said door panel comprises an engaging groove that opens upwards which is provided in said inner panel.

22. A structure of a door for an automotive vehicle as claimed in claim 8, wherein said door panel has an engaging portion;

said key cylinder has an extension portion extending toward an inner side of said automotive vehicle body; and said extension portion is engaged with said engaging portion of said door panel so that said key cylinder is controlled from moving in transverse and vertical directions of said door panel.

23. A structure of a door for an automotive vehicle as claimed in claim 22, wherein said engaging portion of said door panel comprises an engaging groove and an end retainer, said engaging groove being provided in said inner panel and opening upwards, said end retainer being mounted to said inner panel and covering said upward opening of said engaging groove.

24. A structure of a door for an automotive vehicle as claimed in claim 1, wherein a portion of said door panel in the vicinity of a site at which said bracket is mounted is reinforced with a reinforcement.

25. A structure of a door for an automotive vehicle as claimed in claim 24, wherein said reinforcement together with said door panel forms a closed section.

26. A structure of a door for an automotive vehicle as claimed in claim 1, wherein said door is a side door mounted at the side of said automotive vehicle body.

27. A structure of a door for an automotive vehicle as claimed in claim 13, wherein said first sheet is connected to said second sheet above said key cylinder.

28. A structure of a door for an automotive vehicle as claimed in claim 11, wherein said plurality of sheets of said plate member are connected to each other above said key cylinder.

29. A structure of a door for an automotive vehicle as claimed in claim 11, wherein said key cylinder extends and passes through an entire thickness of said plurality of sheets of said plate member; and at least an outermost sheet of said plurality of sheets of said plate member is attached to said key cylinder.

30. A structure of a door for an automotive vehicle as claimed in claim 11, wherein said key cylinder extends and passes through an entire thickness of said plurality of sheets of said plate member; and a key rod operated by said key cylinder is disposed on an inner side of an innermost sheet of said plurality of sheets.

* * * * *